United States Patent
Kurokawa

(10) Patent No.: US 7,818,502 B2
(45) Date of Patent: Oct. 19, 2010

(54) SELECTIVELY POWERING DOWN TAG OR DATA MEMORIES IN A CACHE BASED ON OVERALL CACHE HIT RATE AND PER SET TAG HIT RATE

(75) Inventor: Yoshiyuki Kurokawa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 414 days.

(21) Appl. No.: 11/909,652

(22) PCT Filed: Mar. 24, 2006

(86) PCT No.: PCT/JP2006/306765

§ 371 (c)(1),
(2), (4) Date: Sep. 25, 2007

(87) PCT Pub. No.: WO2006/106890

PCT Pub. Date: Oct. 12, 2006

(65) Prior Publication Data

US 2009/0077319 A1   Mar. 19, 2009

(30) Foreign Application Priority Data

Mar. 31, 2005   (JP) ............................. 2005-102105

(51) Int. Cl.
*G06F 12/08* (2006.01)
(52) U.S. Cl. ..................................... 711/128
(58) Field of Classification Search ............... None
See application file for complete search history.

(56) References Cited

U.S. PATENT DOCUMENTS

| | | | |
|---|---|---|---|
| 5,761,715 A | 6/1998 | Takahashi | |
| 5,845,309 A | 12/1998 | Shirotori et al. | |
| 5,870,616 A | 2/1999 | Loper et al. | |
| 6,684,298 B1 | 1/2004 | Dwarkadas et al. | |
| 7,257,678 B2 | 8/2007 | Golden et al. | |
| 7,418,553 B2 | 8/2008 | Yoshimi | |

(Continued)

FOREIGN PATENT DOCUMENTS

EP   1 684 180 A1   7/2006

(Continued)

OTHER PUBLICATIONS

European Search Report re application No. EP 06730713.2, dated Dec. 22, 2008.

(Continued)

*Primary Examiner*—Kevin Verbrugge
(74) *Attorney, Agent, or Firm*—Husch Blackwell LLP Welsh Katz

(57) ABSTRACT

A CPU incorporating a cache memory is provided, in which a high processing speed and low power consumption are realized at the same time. A CPU incorporating an associative cache memory including a plurality of sets is provided, which includes a means for observing a cache memory area which does not contribute to improving processing performance of the CPU in accordance with an operating condition, and changing such a cache memory area to a resting state dynamically. By employing such a structure, a high-performance and low-power consumption CPU can be provided.

40 Claims, 7 Drawing Sheets

U.S. PATENT DOCUMENTS

| | | |
|---|---|---|
| 7,437,513 B2 | 10/2008 | Saida et al. |
| 7,502,887 B2 | 3/2009 | Tanaka et al. |
| 2004/0184340 A1 | 9/2004 | Dwarkadas et al. |

FOREIGN PATENT DOCUMENTS

| | | |
|---|---|---|
| GB | 2 304 215 A | 3/1997 |
| JP | 1-233537 | 9/1989 |
| JP | 1-290051 | 11/1989 |
| JP | 8-263370 | 10/1996 |
| JP | 10-124202 | 5/1998 |
| JP | 2000-215104 | 8/2000 |
| JP | 2004-185576 | 7/2004 |
| JP | 2005-316842 | 11/2005 |
| JP | 2008-515095 | 5/2008 |
| WO | WO 2004/104841 A1 | 12/2004 |
| WO | WO 2005/048112 A1 | 5/2005 |
| WO | WO 2006/039153 A1 | 4/2006 |

OTHER PUBLICATIONS

International Search Report re application No. PCT/JP2006/306765, dated May 16, 2006.

Written Opinion re application No. PCT/JP2006/306765, dated May 16, 2006.

Patterson, D.A. et al, "Computer Architecture: A Quantitative Approach," Nikkei Business Publications, Tokyo, Japan, Dec. 25, 1992, pp. 418-419 (with partial English translation, pp. 1-2).

Patterson, D.A. et al, *Computer Architecture: A Quantitative Approach*, $2^{nd}$ edition, Morgan Kaufmann Publishers, Inc., 1996, pp. 384-386.

Patterson, D.A. et al, *Computer Architecture: A Quantitative Approach*, 3rd edition, Morgan Kaufmann Publishers, Inc., 2003, pp. 393-395.

SELECTIVELY POWERING DOWN TAG OR DATA MEMORIES IN A CACHE BASED ON OVERALL CACHE HIT RATE AND PER SET TAG HIT RATE

TECHNICAL FIELD

The present invention relates to an arithmetic processing device on which an associative cache memory including a plurality of sets is mounted, in particular, an arithmetic processing device capable of changing a predetermined set during operation in accordance with an operating condition.

BACKGROUND ART

Almost all arithmetic processing devices typified by a current CPU (Central Processing Unit) have architecture referred to as a stored program system. In the stored program system, instruction to be processed by a CPU and data required for the processing are stored in a memory. The processing by the CPU proceeds by sequentially reading out the data in the memory. Therefore, in a system on which a CPU is mounted, a memory access speed is very important to determine performance of the entire system. This is why a cache memory is mounted on many CPUs.

A cache memory is a high-speed memory for copying a part of contents of a main memory (an external memory) in which data is written in/read out at low speed so as to store it. Note that a case where data required for a CPU is in the cache memory is referred to as a cache hit. On the other hand, a case where data required for a CPU is not in the cache memory is referred to as a cache miss. Non-Patent Document 1 can be referred to for information on performance of such a cache memory.

In the case of a cache miss, a low-speed main memory is accessed. Accordingly, the higher a cache hit probability (a cache hit rate) is, that is, the lower a cache miss probability (a cache miss rate) is, the faster a CPU can carry out a processing. That is, in the system on which a CPU is mounted, performance of the entire system can be improved.

[Non-Patent Document 1] J. Hennessy and D. Patterson, "Computer Architecture", Nikkei Business Publications. Inc, pp. 418-419

DISCLOSURE OF INVENTION

In general, the larger a cache memory is, the less cache misses occur. Therefore, a faster processing of a CPU can be realized by increasing capacity of a cache memory. In the CPU; however, a cache memory is one of the highest power consumption blocks. Accordingly, at the same time as improving the processing speed of the CPU by increasing capacity, it is also necessary to realize low power consumption in the cache memory.

The cache memory of the CPU includes a tag memory for storing a part of or an entire original address with respect to contents copied from a main memory, and a data memory for copying contents stored in the address. When reading out the cache memory, the address is compared with data (tag data) stored in the tag memory and at the same time, the copied data (copy data) is read out. Here, a case where the address corresponds to the tag data is a cache hit, and the read copy data is used for processing of the CPU. On the other hand, a case where the address does not correspond to the tag data is a cache miss, and the read copy data has no effectiveness; therefore, data required for processing the CPU is required to be obtained by accessing the main memory again.

As a typical structure of the cache memory, a fully set associative system, a direct mapped system, an n-way set associative system, and the like are cited. Hereinafter, brief description is made on each of the systems.

According to the fully set associative system, all bits of the original address are stored in the tag memory. When reading out the cache memory, tag data in all rows (entry) of the tag memory is read out and each of the data is compared with the address. In the case where they correspond to each other, the copy data in the pertinent entry has effectiveness. Although data can be copied from any address of the main memory, a comparing circuit becomes complicated in accordance with capacity of the cache memory. Therefore, this system is effective in the case of a small number of entries, that is, a cache memory having small capacity.

According to the direct mapped system, a part of bits of the address of the main memory is stored in the tag memory. Normally, a high-order bit of the address is stored. Further, an entry of the tag memory in which data can be stored is designated by a low-order bit of the address. When reading out the cache memory, the tag data read out from only the entry of the tag memory, which is designated by the low-order bit of the address, is compared with the high-order bit of the address. In the case where they correspond to each other, the copy data in the pertinent entry has effectiveness. Although a comparing circuit can be simplified, in the case where the addresses each of which has the same low-order bit are frequently accessed, a cache hit rate is lowered. That is, this system is effective in the case where data required for a CPU has locality, and when a large-scale program is carried out, the performance is deteriorated.

According to the n-way set associative system, a tag memory and a data memory are set to be one pair, and n (normally, 2, 4, or 8) pairs of sets are formed. A part of bits of the address of the main memory is stored in a tag memory included in any of the sets. Normally, a high-order bit of the address is stored. Further, an entry of the tag memory in which data can be stored is designated by a low-order bit of the address. When reading out the cache memory, a tag data read out from only an entry of each tag memory, which is designated by the low-order bit of the address, is compared with the high-order bit of the address of each tag memory of all sets. In the case where they correspond to one another, the copy data in the entry of the pertinent set has effectiveness. Although a comparing circuit is complicated slightly, even in the case where the addresses each of which has the same low-order bit are frequently accessed, a cache hit rate is not lowered.

Here, detailed description is made on an n-way set associative cache memory which is generally used as a cache memory of a high-performance CPU. Note that a summary is made on a 2 set associative cache memory for simplicity.

A structure of the cache memory is shown in FIG. 1. Here, a cache memory 101 includes a first set 102, a second set 103, a tag comparing circuit 104, and a data selecting circuit 105. The first set 102 includes a first tag memory 106 and a first data memory 107. The second set 103 includes a second tag memory 108 and a second data memory 109. The tag comparing circuit 104 includes a first comparing circuit 110 and a second comparing circuit 111.

Here, in the cache memory, a copy of a part of contents in a main memory is stored. That is, with respect to the contents in a specific address of the main memory, a high-order bit of the address is stored in any one of entries of the first tag memory 106 and the second tag memory 108, which is designated by a low-order bit of the address.

Further, in the case where the high-order bit of the address is stored in the first tag memory 106 and in the case where it is stored in the second tag memory 108, the contents of the address of the main memory (copy data) are stored in an entry designated by the low-order bit of the address of the first data memory 107 and an entry designated by the low-order bit of the address of the second data memory 109, respectively.

Description is made on operation of the cache memory. First, the cache memory receives an address 112 of the main memory in which data required next for the CPU is stored.

Second, a high-order bit (address high-order bit) 113 of the address 112 is sent to the tag comparing circuit 104, and a low-order bit (address low-order bit) 114 of the address 112 is sent to the first set 102 and the second set 103. In the first set 102, the address low-order bit 114 is decoded, and the first tag data 115 and the first copy data 116 which are stored in an entry of the first tag memory 106 and an entry of the second data memory 107 respectively are outputted. Similarly, the second tag data 117 and the second copy data 118 are outputted from the second set 103.

Third, in the first comparing circuit 110, the address high-order bit 113 is compared with the first tag data 115 so as to output a first tag hit signal 119. Here, in the case where they correspond to each other, the first tag hit signal 119 is set to "1", and in the case where they do not correspond to each other, it is set to "0". Similarly, in the second comparing circuit 111, the address high-order bit 113 is compared with the second tag data 117 so as to output a second tag hit signal 120.

Finally, in the data selecting circuit 105, in the case where the first tag hit signal 119 is "1", the first copy data 116 is outputted as cache data 121, and in the case where the second tag hit signal 120 is "1", the second copy data 118 is outputted as the cache data 121. Further, a cache hit signal 122 is outputted, which is set to "1" in the case where either the first tag hit signal 119 or the second tag hit signal 120 is "1".

In the case where the cache hit signal 122 is "1", the CPU can use the cache data 121 as effective data which is the same as contents stored in the address 112 of the main memory. On the other hand, in the case where the cache hit signal 122 is "0", which means a cache miss, necessary data is required to be obtained by accessing the main memory.

In the case of the 2 way set associative cache memory, at least one of the first copy data 116 and the second copy data 118 is not used consistently. That is, a current required for reading out data is constantly wasted as unused power consumption. In an n-way set associative cache memory, as the number of the sets increases, processing performance is improved; however, wasteful power consumption is increased.

In view of the aforementioned problems, the present invention provides a high-performance and low-power consumption arithmetic processing device on which the n-way set associative cache memory is mounted by changing an operating set dynamically in accordance with an operating condition. In the invention, the arithmetic processing device includes a CPU and a DSP (Digital Signal Processor).

A structure of the invention disclosed in the specification is an arithmetic processing device on which an associative cache memory is mounted. The cache memory includes at least one set. Each set includes a data memory and a tag memory, and has a means for transitioning between an operating state and a resting state. The arithmetic processing device has a means for counting the number of accesses to the cache memory, the number of cache hits, the number of tag hits in each set, and a cache hit rate obtained by dividing the number of cache hits by the number of accesses in an arbitrary period.

According to the aforementioned structure, the arithmetic processing device may have a means for transitioning either a data memory or a tag memory at an operating state to a resting state in accordance with a result from a comparison between the cache hit rate and a standard value of the hit rate set arbitrarily. Note that in this specification, a transition includes a reversible change. Specifically, the transition includes a change from a resting state to an operating state as well as a change from an operating state to a resting state.

Further, according to the aforementioned structure, the arithmetic processing device may have a means for transitioning either a data memory or a tag memory at a resting state to an operating state in accordance with a result from a comparison between the cache hit rate and a standard value of the hit rate set arbitrarily.

Further, according to the aforementioned structure, the arithmetic processing device may have a means for transitioning at least one of the sets at an operating state to a resting state per period prescribed by a standard value of the period which is set arbitrarily.

Further, according to the aforementioned structure, the arithmetic processing device may have a means for transitioning a set at an operating state, which has the least number of tag hits, to a resting state per period prescribed by a standard value of the period which is set arbitrarily.

Further, according to the aforementioned structure, the arithmetic processing device may have a means for transitioning at least one of the sets at a resting state to an operating state per period prescribed by a standard value of the period which is set arbitrarily.

Further, according to the aforementioned structure, the arithmetic processing device may have a means for transitioning a set at an operating state, which has the least number of tag hits, to a resting state in accordance with a result from a comparison between the cache hit rate and a standard value of the hit rate set arbitrarily.

According to the aforementioned structure, the arithmetic processing device may have a means for transitioning at least one set at an operating state to a resting state in accordance with a result from a comparison between the cache hit rate and a standard value of the hit rate set arbitrarily.

Further, according to the aforementioned structure, the arithmetic processing device may have a means for transitioning at least one set at a resting state to an operating state in accordance with a result from a comparison between the cache hit rate and a standard value of the hit rate set arbitrarily.

Further, according to the aforementioned structure, the arithmetic processing device desirably has a means for transitioning a set transitioned at a resting state in operation to an operating state again in accordance with a result from a comparison between the cache hit rate and a standard value of the hit rate set arbitrarily after an operation of transitioning the set at an operating state to a resting state.

Further, according to the aforementioned structure, the arithmetic processing device desirably has a means for transitioning a set transitioned at an operating state in operation to a resting state again in accordance with a result from a comparison between the cache hit rate and a standard value of the hit rate set arbitrarily after an operation of transitioning the set at a resting state to an operating state.

Further, according to the aforementioned structure, the arithmetic processing device desirably has a means for controlling an operation of transitioning the set at an operating state to a resting state or an operation of transitioning the set at a resting state to an operating state by instruction.

Further, according to the aforementioned structure, the arithmetic processing device desirably has a means for controlling an operation of transitioning the set at an operating state to a resting state or an operation of transitioning the set at a resting state to an operating state by a control circuit mounted on the arithmetic processing device and instruction of the arithmetic processing device.

Further, according to the aforementioned structure, the arithmetic processing device desirably has a means for changing the standard value of a period and the standard value of a hit rate in operation.

Further, according to the aforementioned structure, it is desirable that the arithmetic processing device has a means for determining the standard value of a period and the standard value of a hit rate that are appropriate for each program to be operated, and uses an appropriate value for each program as the standard values in carrying out the program from the next time.

Note that as a means for transitioning between an operating state and a resting state, for example, a set control circuit including a counting circuit, a requirement determining circuit, a register and the like is cited. More specifically, the transition between an operating state and a resting state can be carried out by a set control signal from the set control circuit. Further, the arithmetic processing device rewrites a value of the register; thereby a standard value of a period and a standard value of a hit rate are changed. An appropriate standard value for each program is preferably used.

Further, according to the aforementioned structure, a resting state may be a state where a pre-charging operation, which is carried out when data stored in a data memory and a tag memory are read out, is not carried out. Alternatively, a resting state may be a state where a power source voltage is not supplied to a data memory and a tag memory.

Further, according to the aforementioned structure, an arithmetic processing device is formed of a thin film transistor using a semiconductor thin film formed over a substrate having an insulating surface as an active layer. The substrate having an insulating surface may be any one of a glass substrate, a quartz substrate, a plastic substrate, and an SOI substrate.

Further, the CPU of the aforementioned structure is effectively incorporated in an electronic appliance.

By the invention, in an associative cache memory, a cache memory area which does not contribute to improving processing performance of the arithmetic processing device is observed in accordance with a program carried out by the arithmetic processing device; therefore such a cache memory area can be dynamically changed in a resting state appropriately. That is, power consumed wastefully by reading out data from a cache memory can be reduced while processing performance of the arithmetic processing device is maintained. By mounting such an associative cache memory, a high-performance and low-power consumption CPU can be provided.

The present invention will be fully described by way of an embodiment mode and embodiments with reference to the accompanying drawings. Note that the present invention can be carried out in many different modes. It is to be understood that various changes and modifications will be apparent to those skilled in the art. Therefore, unless such changes and modifications depart from the scope of the invention, they should be construed as being included therein.

Note that identical portions and portions having a similar function in configurations for description of an embodiment mode and embodiments may be denoted by the same reference numerals so as to omit repetitive descriptions.

BEST MODE FOR CARRYING OUT THE INVENTION

Hereinafter, description is made on an embodiment mode of the invention with reference to FIGS. 2 and 3.

Figure 2:
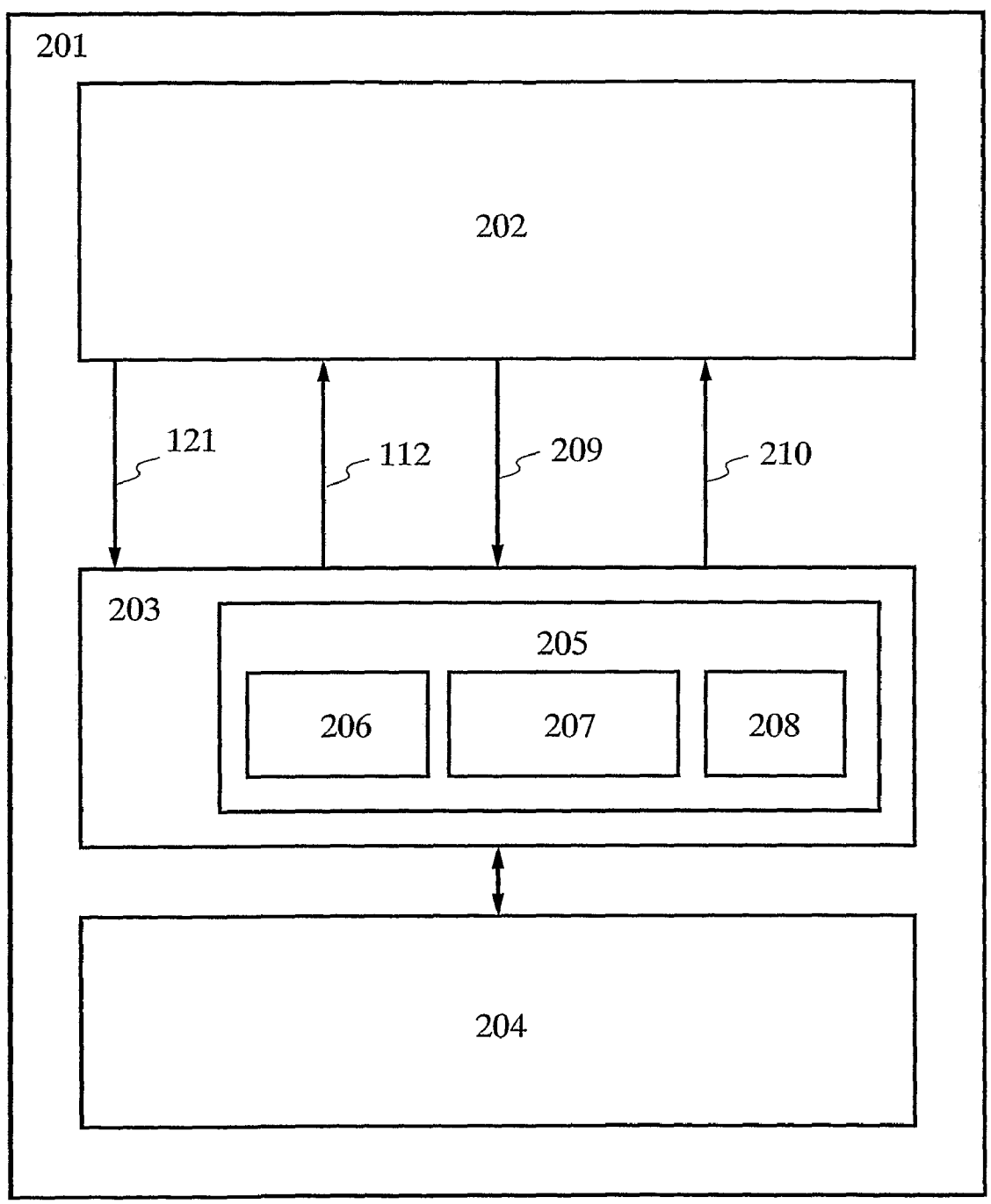
FIG. 2 is a view of an arithmetic processing device of the invention.

According to FIG. 2, a CPU 201 includes a cache memory 202, a controlling portion 203, and a calculating portion 204. The controlling portion 203 includes a set control circuit 205. The set control circuit 205 includes a counting circuit 206, a requirement determining circuit 207, a register 208, and the like. The cache memory 202 outputs a hit signal 209 as well as cache data 121 with respect to the address 112 issued from the controlling portion 203. Controlling in the cache memory 202 is carried out using a set control signal 210 which is an output signal from the controlling portion 203.

Figure 1:
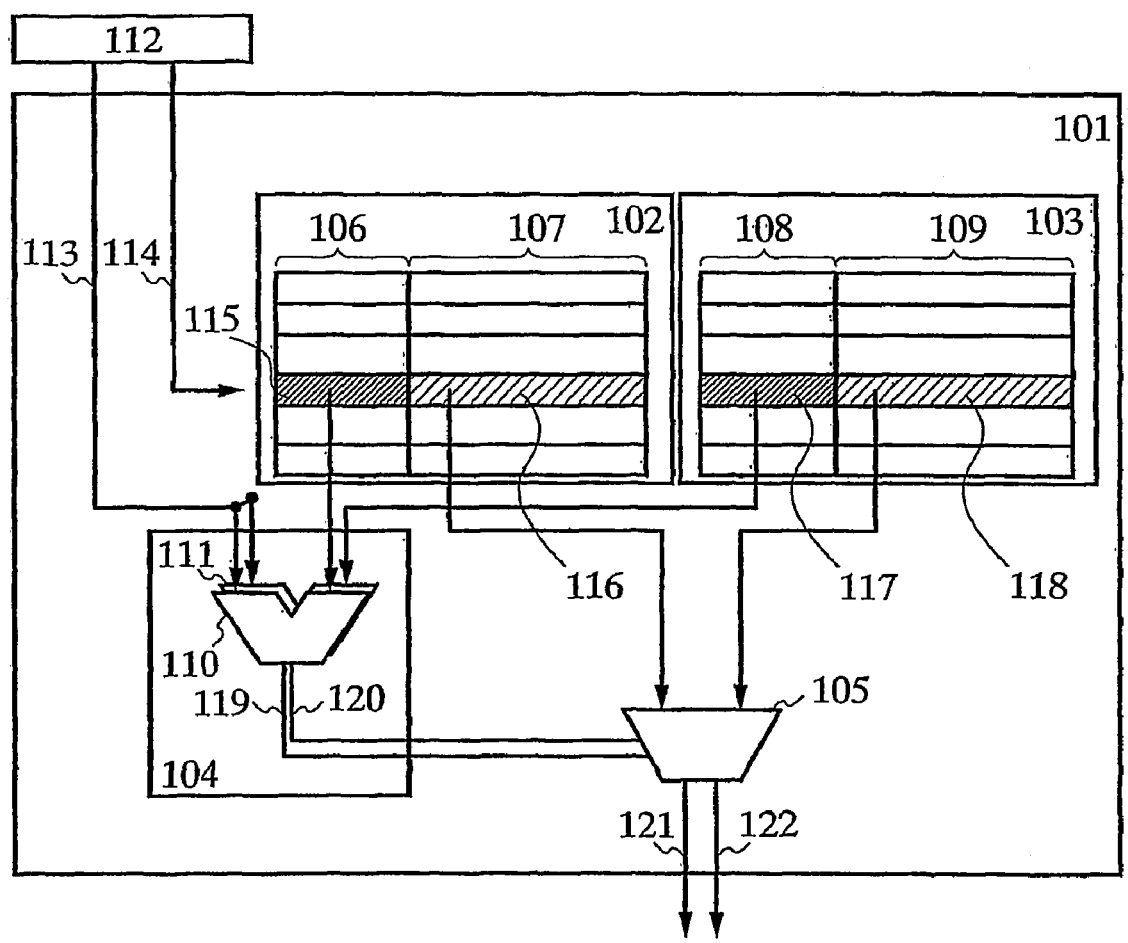
FIG. 1 is a view of a general associative cache memory.

A structure such as FIG. 1 can be applied to the cache memory 202, for example. It is to be noted that transition to an operating/resting state can be realized by the set control signal 210 from the set control circuit 205 per set. That is, FIG. 3 shows a structure which is the structure of FIG. 1, to which a means for transitioning to an operating/resting state per set is added.

Figure 3:
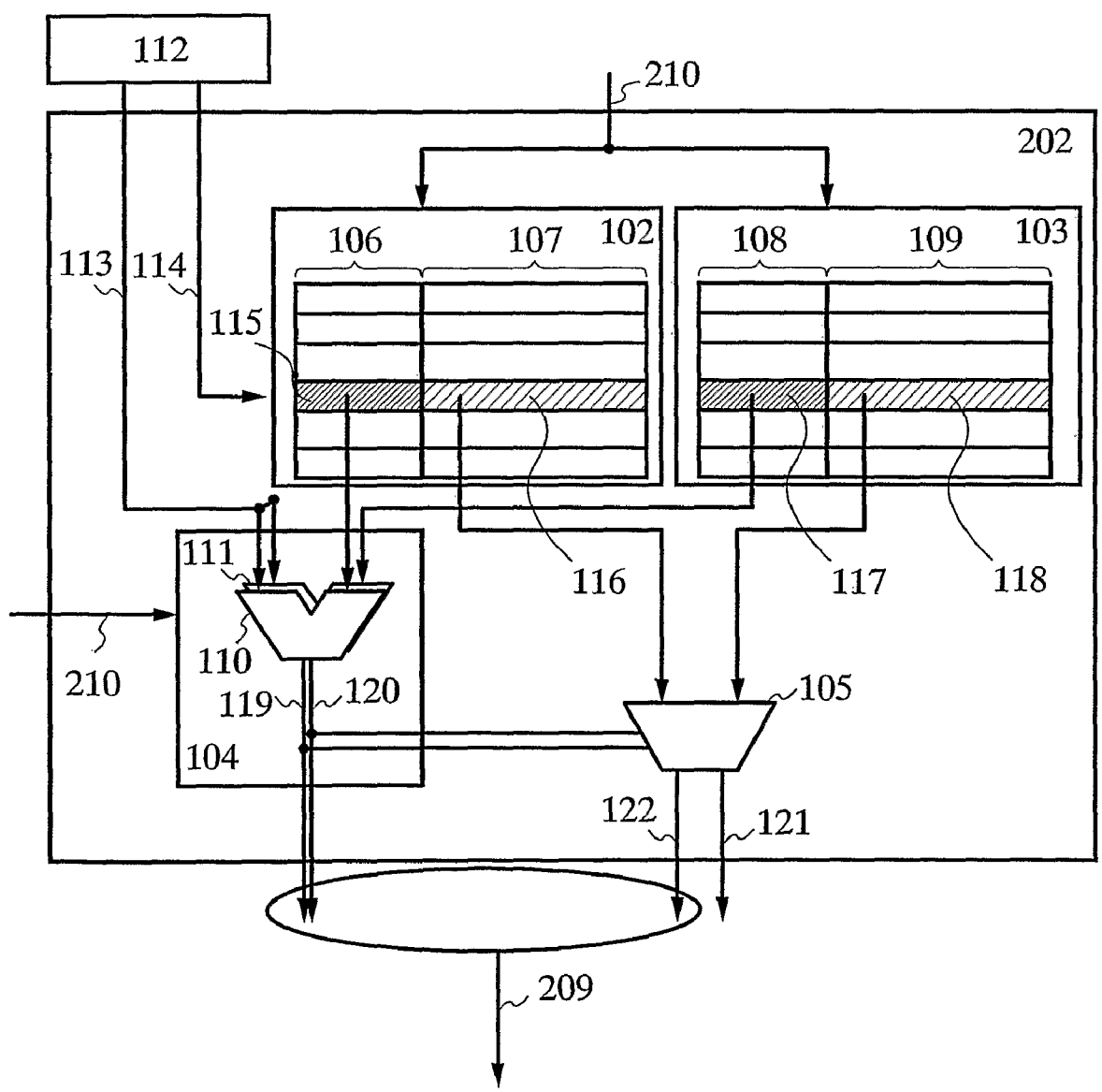
FIG. 3 is a view of an associative cache memory mounted on an arithmetic processing device of the invention.

According to FIG. 3, operations of a tag memory and a data memory in a set to be transitioned to a resting state (resting set) is stopped by the set control signal 210. Specifically, a writing signal and a reading signal from/to the tag memory and the data memory are made ineffective. Normally, a data signal line is required to be pre-charged for reading out the memory. Most of the power of the memory is consumed by the pre-charging. Therefore, by making the reading signal ineffective, power consumption in each set is considerably decreased. Further, by cutting off a power source voltage supplied to each set, power consumption can be reduced further.

Further, the tag comparing circuit 104 for a resting set is effectively made ineffective by the set control signal 210. Specifically, for example, a tag hit signal is always "0". Accordingly, there is no concern for selecting data of the resting set by accident in the data selecting circuit 105. Note that the first tag hit signal 119, the second tag hit signal 120, and the cache hit signal 122 correspond to the hit signal 209.

The set control circuit 205 in FIG. 2 includes the counting circuit 206 which count a cache hit rate and the like, the requirement determining circuit 207, and the register 208.

The counting circuit 206 can count the number of accesses to the cache memory, the number of cache hits, the number of tag hits of each set, and the like. A cache hit rate can be counted by dividing the number of cache hits by the number of accesses. Further, a tag hit rate of each set can be counted by dividing the number of tag hits of each set by the number of accesses.

The requirement determining circuit 207 determines a set to be transitioned to a resting/operating state in accordance with the cache hit rate and the like by a predetermined algorithm. The algorithm for determining a state of each set from the cache hit rate is very important for determining performance of the CPU of the invention, on which the cache memory is mounted. Various systems can be considered in accordance with a specific application of the CPU of the invention.

The register 208 is used for applications such as a setting of a counting requirement in the counting circuit 206, and a setting of a parameter in the requirement determining circuit 207.

By employing the aforementioned mode, a high-performance and low-power consumption CPU on which a cache memory capable of selecting the most appropriate performance and power consumption in accordance with an operating condition is mounted can be provided.

Further, the CPU of this embodiment mode is formed of a thin film transistor using a semiconductor thin film formed over a substrate having an insulating surface such as a glass substrate, a quartz substrate, or a plastic substrate as an active layer so as to provide a more lightweight, high-performance and low-power consumption CPU at low cost.

Further, an electronic appliance is formed using the CPU of this embodiment mode so as to provide a more lightweight, high-performance and low-power consumption electronic appliance at low cost.

Embodiment 1

In this embodiment, with respect to a CPU of the invention, on which a cache memory is mounted, description is made on the algorithm for determining a state of each set from the cache hit rate, for which a specific description is omitted in the embodiment mode.

Figure 5:
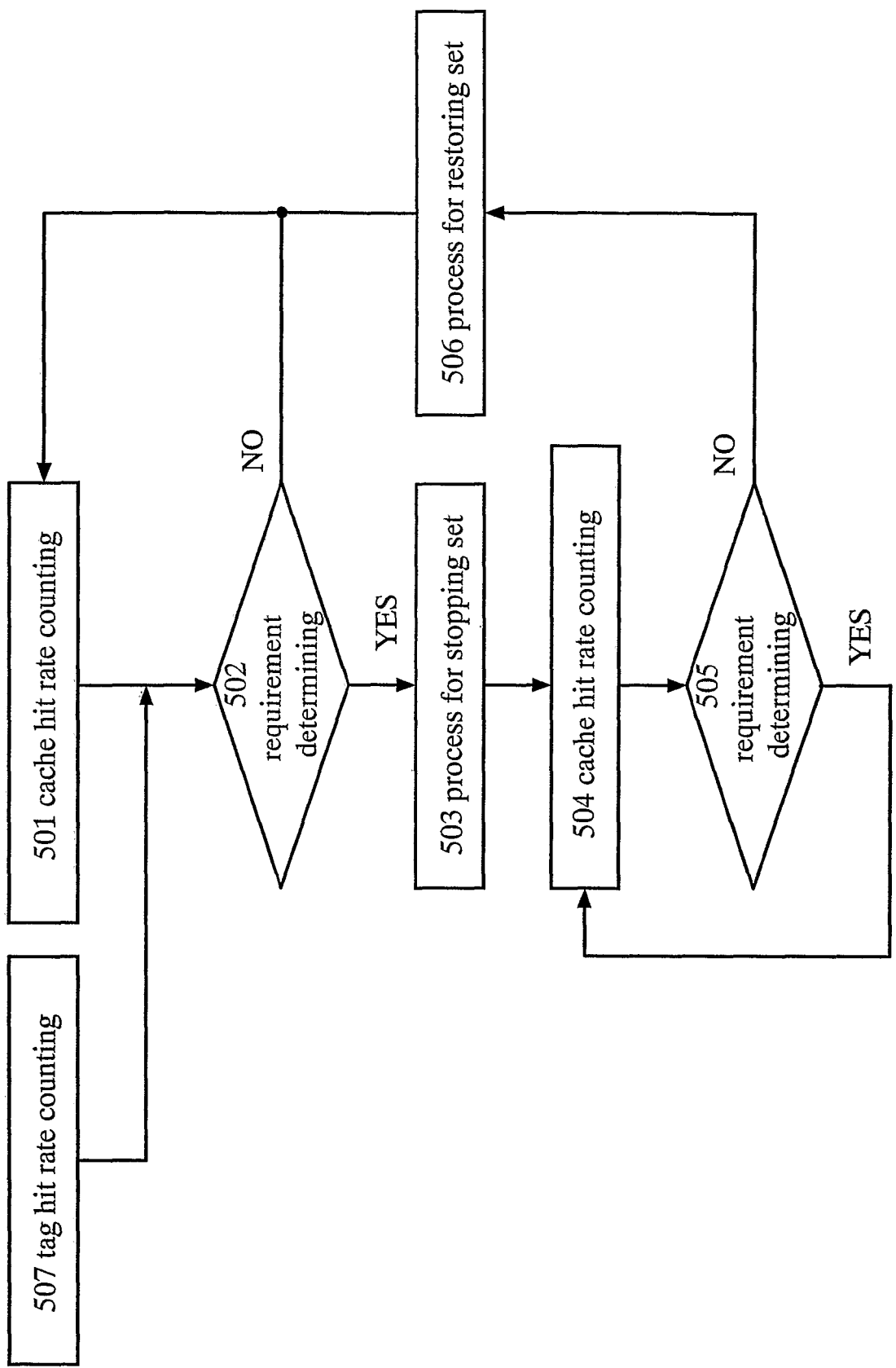
FIG. 5 is a flow chart 1 of an algorithm in a control circuit mounted on an arithmetic processing device of the invention.

Description is made on an algorithm in this embodiment in accordance with a flow chart shown in FIG. 5. A cache hit rate for access of an a number of times, which is an arbitrary number, is counted (cache hit rate counting 501). After the cache hit rate and b % which is a requirement set in advance are compared (requirement determining 502) and an arbitrary set is transitioned from an operating state to a resting state (process for stopping a set 503) in accordance with the result, a cache hit rate in an arbitrary period is counted (cache hit rate counting 504) and set to c %. By comparing the cache hit rate c % with b % which is the requirement set in advance (requirement determining 505), whether a state is restored to a state before the transition or not is determined in accordance with the result (process for restoring a set 506). The algorithm corresponds to determining the number of sets while testing whether the cache hit rate can be maintained by the smaller number of sets. By setting the number of sets to be smaller, power consumption in a semiconductor device can be decreased. Note that the algorithm described here can be carried out by software (program) or hardware.

Hereinafter, description is made on a case where the operation is carried out by hardware. The cache hit rate in the case of an a number of times of access is counted in a counting circuit so as to be stored in a register. The cache hit rate and b % which is a requirement set in advance are compared by a requirement determining circuit and an arbitrary set is transitioned from an operating state to a resting state by changing a set control signal in accordance with the result. After that, the cache hit rate in an arbitrary period is counted in a counting circuit and set to c %. By comparing the cache hit rate c % with b % which is the requirement set in advance by the requirement determining circuit, whether a state is to be restored to a state before the transition or not is determined. Thus, power consumption in the semiconductor device can be decreased.

Here, as a requirement for transitioning an arbitrary set to a resting state, it is effective to set a cache hit rate to be b % or more when a cache memory functions very effectively. The cache hit rate corresponds to a case where a program size is very small, and all programs can be copied from a main memory to a cache memory.

Further, as a requirement for transitioning an arbitrary set to a resting state, a cache hit rate is effectively set to b % and less when a cache memory hardly functions. The cache hit rate corresponds to a case where a program size is small, but data to be processed is dotted over a main memory. In this case, if the program is copied to a cache memory, it is considered that processing speed of a CPU hardly changes.

Note that the aforementioned two requirements are effectively combined so as to reduce power consumption, since whether a state is transitioned to a resting state or not can be determined more elaborately.

In the algorithm of this embodiment, although parameters a, b, and c can be set as fixed values, it is desirable that they are appropriately renewed while observing a cache hit rate. This is because the most appropriate standard value depends on a program that is actually carried out in a CPU. Note that a renewal of the values is carried out by rewriting a value of a register by the CPU.

Further, the most appropriate a, b, and c of a program carried out once are stored, and values will be effectively set to them when the program is carried out next time, in particular, in the case where a CPU is used for a system such as a personal computer which may carry out various programs. Note that the register 208 in FIG. 2 is effectively used to store the parameters a, b, and c.

Further, a tag hit rate per set in the case of an arbitrary number of a' times of access is counted (tag hit rate counting 507), and a set to be transitioned to a resting state is determined; therefore more appropriate control is enabled. It is considered that a cache hit rate is slightly lowered before and after a low-tag hit rate set is stopped. Accordingly, the resting set can be effectively controlled. Therefore, power consumption can be reduced more elaborately.

By employing the aforementioned structure, a high-performance and low-power consumption CPU on which a cache memory capable of selecting the most appropriate performance and power consumption in accordance with an operating condition is mounted can be provided.

Note that the CPU of this embodiment is formed of a thin film transistor using a semiconductor thin film formed over a substrate having an insulating surface such as a glass substrate, a quartz substrate, or a plastic substrate as an active layer so as to provide a more lightweight, high-performance and low-power consumption CPU at low cost.

Further, an electronic appliance is formed by using the CPU of this embodiment so as to provide a more lightweight, high-performance and low-power consumption electronic appliance at low cost.

This embodiment can be implemented by freely combining with the best mode for carrying out the invention.

Embodiment 2

In this embodiment, with respect to a CPU of the invention on which a cache memory is mounted, description is made on an algorithm which is different from the algorithm for determining a resting set from a cache hit rate of Embodiment 1.

Figure 6:
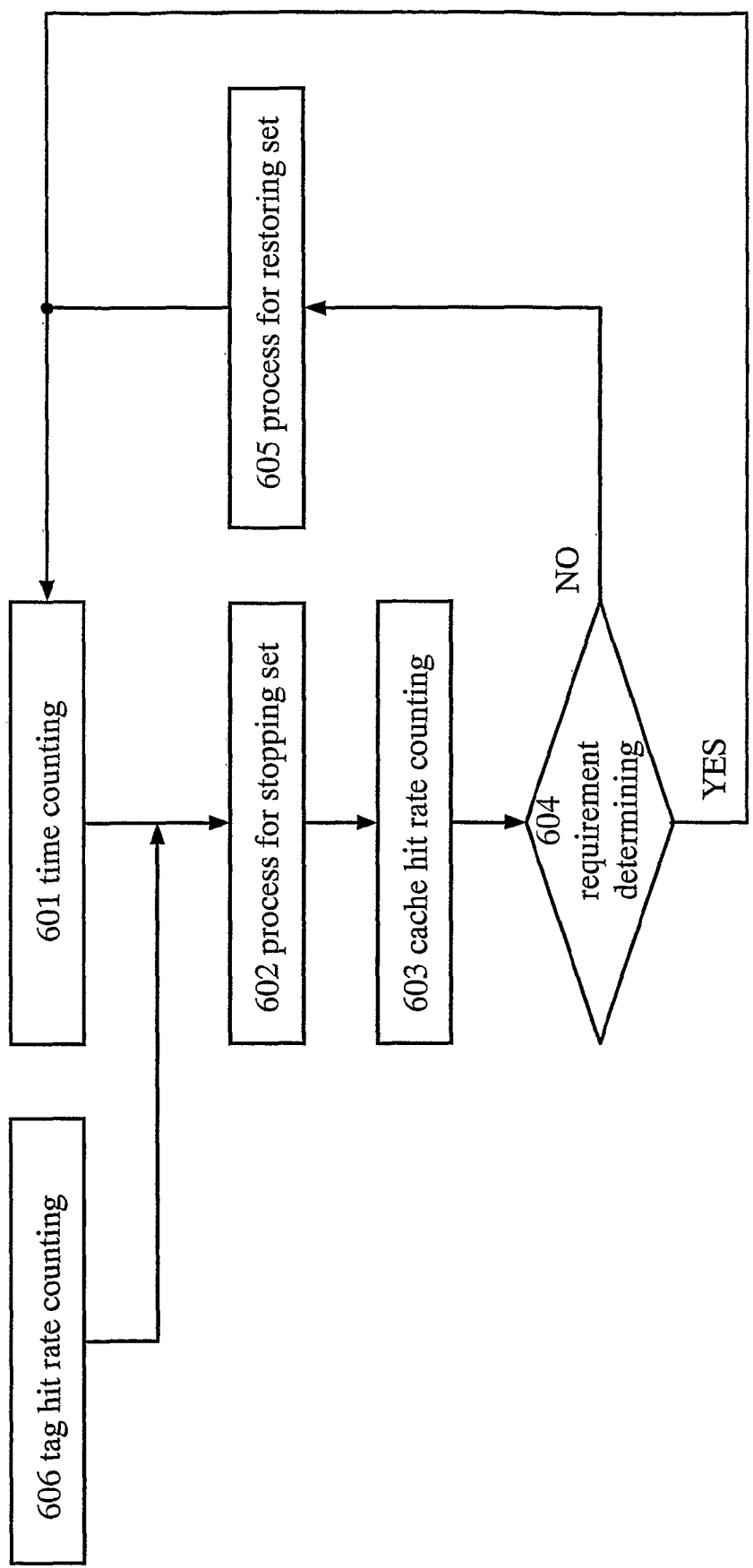
FIG. 6 is a flow chart 2 of an algorithm in a control circuit mounted on an arithmetic processing device of the invention.

Description is made on an algorithm of this embodiment with reference to a flowchart in FIG. 6. An appropriate time period of d second is counted (time counting 601), an arbitrary set is transitioned from an operating state to a resting state (process for stopping a set 602), and then a cache hit rate is counted (cache hit rate counting 603). The cache miss rate is compared with e % which is a requirement set in advance (requirement determining 604), and whether a state is restored to a state before the transition or not is determined in accordance with the result (process for restoring a set 605). The algorithm corresponds to investigating a cache memory size and effectiveness thereof regularly, and testing whether the cache hit rate can be maintained or not even with the smaller number of sets. By setting the number of sets to be smaller, power consumption of a semiconductor device can be decreased. Note that the algorithm described here can be carried out by software (program) or hardware.

Description is made on a case where the operation is carried out by hardware. A period of d second is counted in a counting circuit, and an arbitrary set is transitioned from an operating state to a resting state by changing a set control signal. Thereafter, a cache hit rate is counted in a counting circuit so as to store in a register. Then, the cache miss rate is compared with e % which is a requirement set in advance by a requirement determining circuit, and whether a state is restored to a state before the transition or not is determined in accordance with the result.

In an algorithm of this embodiment, although parameters d and e can be set as fixed values, it is preferable that they are appropriately renewed while observing a cache hit rate. This is because the most appropriate standard value depends on a program that is actually carried out in a CPU. Note that the values are renewed by rewriting a value of a register by the CPU.

Further, the most appropriate d and e of a program carried out once are stored, and values will be effectively set to them when the program is carried out next time, in particular, in the case where a CPU is used for a system such as a personal computer which may carry out various programs. Note that the register 208 in FIG. 2 is effective in storing the parameters d and e.

Further, a tag hit rate per set in the case of an access for an arbitrary period of d seconds is counted (tag hit rate counting 606), and a set to be transitioned to a resting state is determined; therefore, more appropriate control is enabled. It is considered that a cache hit rate is slightly lowered before and after a low-tag hit rate set is stopped. Accordingly, the resting set can be effectively controlled. Therefore, power consumption can be reduced elaborately.

By employing the aforementioned structure, a high-performance and low-power consumption CPU on which a cache memory capable of selecting the most appropriate performance and power consumption in accordance with an operating condition is mounted can be provided.

Note that the CPU of this embodiment is formed of a thin film transistor using a semiconductor thin film formed over a substrate having an insulating surface such as a glass substrate, a quartz substrate, or a plastic substrate as an active layer so as to provide a more lightweight, high-performance and low-power consumption CPU at low cost.

Further, an electronic appliance is formed by using the CPU of this embodiment so as to provide a more lightweight, high-performance and low-power consumption electronic appliance at low cost.

This embodiment can be implemented by freely combining with the best mode for carrying out the invention and Embodiment 1.

Embodiment 3

In this embodiment, description is made on a personal computer as a system using a CPU of the invention.

Figure 7:
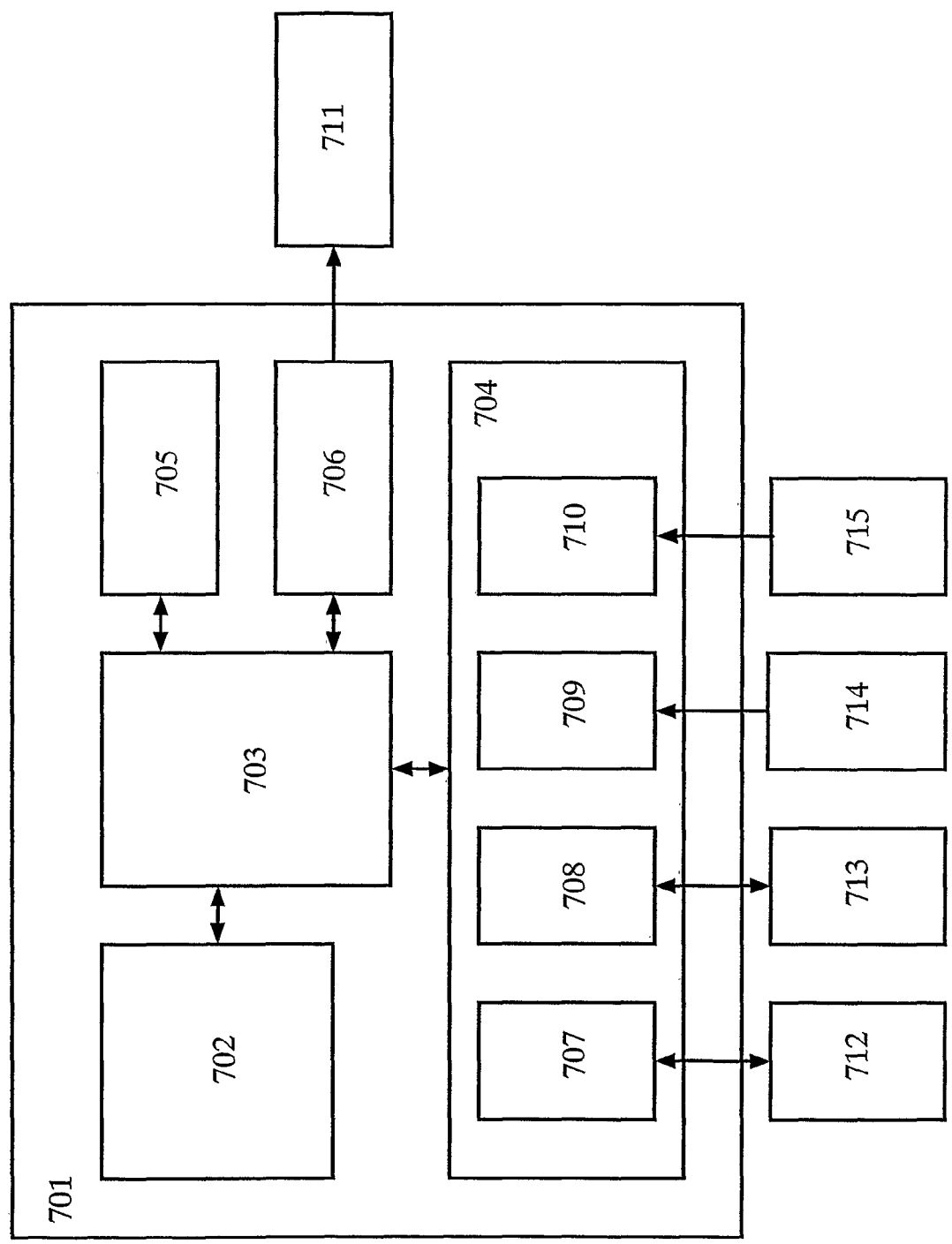
FIG. 7 is a configuration of a system using an arithmetic processing device of the invention.

FIG. 7 shows a configuration of a personal computer. In FIG. 7, a CPU 702, a north bridge (NB) 703, a south bridge (SB) 704, an SDRAM 705, and an image processing circuit 706 are mounted on a mother board 701. On the SB 704, a hard disc controller 707, a flexible disc cartridge controller 708, a mouse controller 709, and a keyboard controller 710 are mounted. The image processing circuit 706, the hard disc controller 707, the flexible disc cartridge controller 708, a mouse 714, and a keyboard 715 control a display 711, a hard disc 712, a flexible cartridge 713, the mouse controller 709, and the keyboard controller 710 respectively.

Here, the NB 703 is a semiconductor device in which controller circuits for a semiconductor device which transfers data to and from the CPU 702 at a high speed, such as the SDRAM 705 and the image processing circuit 706, are integrated. Further, the SB 704 is a semiconductor device in which the controller circuits for a semiconductor device which transfers data to and from the CPU 702 at a low speed are integrated.

By using the invention for the CPU 702, a high-performance and low-power consumption system can be provided. Further, by using the invention for a processor inside the image processing circuit 706, a higher-performance and lower-power consumption system can be provided.

This embodiment can be implemented by freely combining with the best mode for carrying out the invention and Embodiments 1 and 2.

Embodiment 4

In this embodiment, description is made on examples of an electronic appliance manufactured by using a CPU of the invention with reference to FIG. 4.

As electronic appliances manufactured by using the invention, there are cameras such as a video camera and a digital camera, a goggle type display (head mounted display), a navigation system, an audio reproducing device (car audio component stereo, audio component stereo or the like), a personal computer, a game machine, a portable information terminal (mobile computer, mobile phone, mobile game machine, an electronic book, or the like), an image reproducing device having a recording medium (specifically, a device for reproducing a recording medium such as a digital versatile disk (DVD) and having a display for displaying the reproduced image), and the like. Specific examples of these electronic appliances are shown in FIGS. 4A to 4G.

Figure 4A:
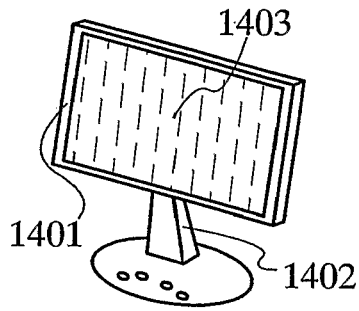
FIGS. 4A to 4G are views of electronic appliances to which an arithmetic processing device of the invention is applied.

FIG. 4A is a display device, which includes a housing 1401, a supporting base 1402, and a display portion 1403. The invention can be applied to a controller of the display portion 1403. By using the invention, power consumption of the display device can be lowered.

Figure 4B:
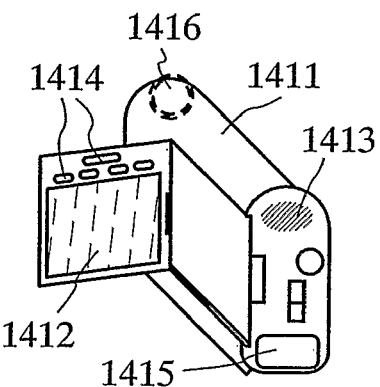

FIG. 4B is a video camera, which includes a main body 1411, a display portion 1412, an audio inputting portion 1413, operating switches 1414, a battery 1415, an image receiving portion 1416, and the like. The invention can be applied to a CPU inside the main body 1411 and a controller of the display portion 1412. By using the invention, the video camera can be reduced in size and weight.

Figure 4C:
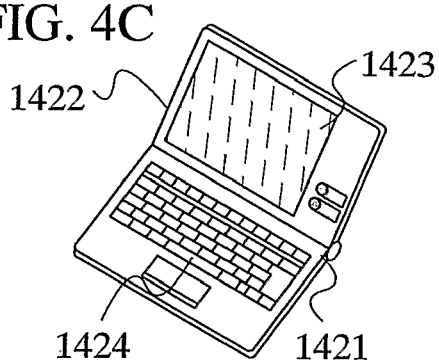

FIG. 4C is a personal computer, which includes a main body 1421, a housing 1422, a display portion 1423, a keyboard 1424, and the like. The invention can be applied to a controller of the display portion 1423. Further, the invention can be applied to a CPU inside the main body 1421. By using the invention, power consumption of the personal computer can be lowered.

Figure 4D:
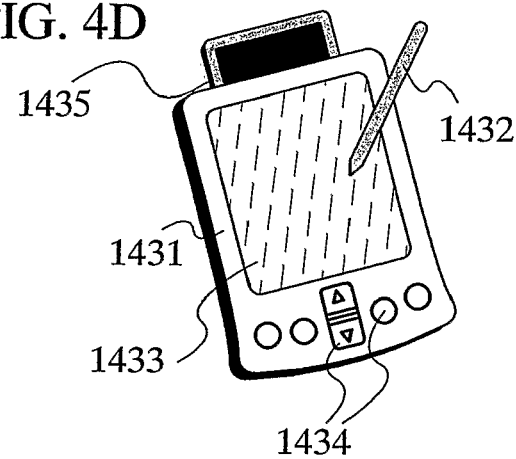

FIG. 4D is a portable information terminal, which includes a main body 1431, a stylus 1432, a display portion 1433, control buttons 1434, an external interface 1435, and the like. The invention can be applied to a controller of the display portion 1433. In addition, the invention can also be applied to a CPU inside the main body 1431. By using the invention, power consumption of the portable information terminal can be lowered.

Figure 4E:
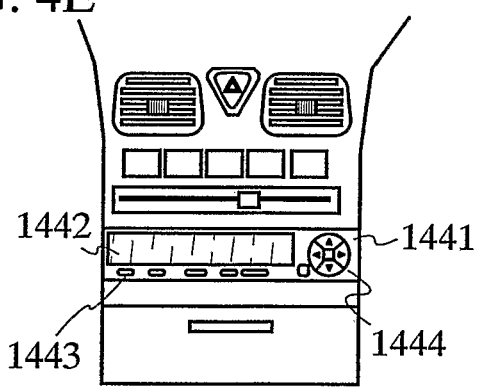

FIG. 4E is an audio reproducing device. Specifically, it is a car audio component device, which includes a main body 1441, a display portion 1442, a control switch 1443, a control switch 1444, and the like. The invention can be applied to a controller of the display portion 1442. In addition, the invention can be also applied to a CPU inside the main body 1441. Although a car audio component is given as an example here, the invention may be applied to a portable audio component device or an audio component device for household use. By using the invention, power consumption of the audio reproducing device can be lowered.

Figure 4G:
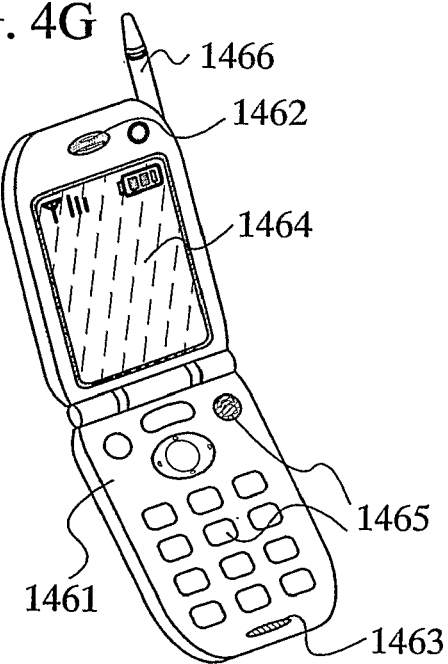
Figure 4F:
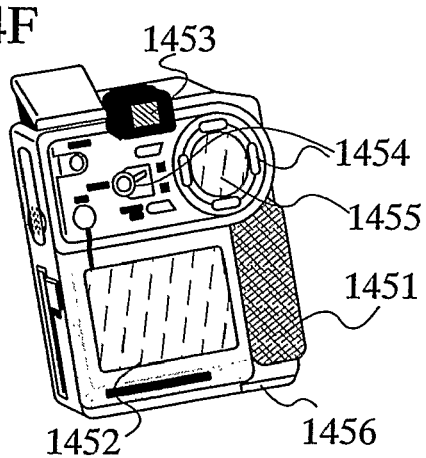

FIG. 4F is a digital camera, which includes a main body 1451, a display portion A 1452, an eye piece 1453, a control switch 1454, a display portion B 1455, a battery 1456, and the like. The invention can be applied to a controller of each of the display portions A 1452 and B 1455. In addition, the invention can also be applied to a CPU inside the main body 1451. By using the invention, power consumption of the digital camera can be lowered.

FIG. 4G is a mobile phone, which includes a main body 1461, an audio outputting portion 1462, an audio inputting portion 1463, a display portion 1464, an operating switch 1465, an antenna 1466, and the like. The invention can be applied to a controller of the display portion 1464. In addition, the invention can be also applied to a CPU inside the main body 1461. By using the invention, power consumption of the mobile phone can be lowered.

A semiconductor device and a display device that are used in these electronic appliances can use a heat resistant plastic substrate as well as a glass substrate. Accordingly, the electronic appliances can be reduced in weight.

The invention is not limited to the aforementioned electronic appliances and can be applied to various electronic appliances using an arithmetic processing device described in the best mode for carrying out the invention and Embodiments 1 to 3.

The invention claimed is:

1. An arithmetic processing device comprising:
a cache memory comprising at least one set including a data memory and a tag memory;
a set control circuit;
a counting circuit; and
a register,
wherein the counting circuit counts the number of accesses to the cache memory, the number of cache hits of the cache memory and the number of tag hits of the tag memory per set;
wherein a cache hit rate is obtained by dividing the number of cache hits by the number of accesses in an arbitrary period;
wherein a tag hit rate per set is obtained by dividing the number of tag hits per set by the number of accesses to the cache memory in the arbitrary period; and
wherein a state of one of the data memory and the tag memory is transitioned to be at an operating state or a resting state by the set control circuit.

2. An arithmetic processing device comprising:
a cache memory comprising at least one set including a data memory and a tag memory;
a set control circuit;
a counting circuit; and
a register,
wherein the counting circuit counts the number of accesses to the cache memory, the number of cache hits of the cache memory and the number of tag hits of the tag memory per set;
wherein a cache hit rate is obtained by dividing the number of cache hits by the number of accesses in an arbitrary period;
wherein a tag hit rate per set is obtained by dividing the number of tag hits per set by the number of accesses to the cache memory in the arbitrary period; and
wherein one of the data memory and the tag memory at an operating state is transitioned to be at a resting state by the set control circuit in accordance with a comparison result between the cache hit rate and a reference value of a first hit rate, and in accordance with the tag hit rate per set.

3. The arithmetic processing device according to claim 2, wherein the reference value of the first hit rate is changed in operation of the arithmetic processing device.

4. The arithmetic processing device according to claim 2, wherein the reference value of the first hit rate is changed per a program carried out by the arithmetic processing device.

5. The arithmetic processing device according to claim 2, wherein the one of the data memory and the tag memory at the resting state is transitioned to be at an operating state by the set control circuit in accordance with a comparison result between a cache hit rate after transition to the resting state and a reference value of a second hit rate.

6. The arithmetic processing device according to claim 5, wherein the reference value of the second hit rate is changed in operation of the arithmetic processing device.

7. The arithmetic processing device according to claim 5, wherein the reference value of the second hit rate is changed per a program carried out by the arithmetic processing device.

8. An arithmetic processing device comprising:
a cache memory comprising at least one set including a data memory and a tag memory;
a set control circuit;
a counting circuit; and
a register,
wherein the counting circuit counts the number of accesses to the cache memory, the number of cache hits of the cache memory and the number of tag hits of the tag memory per set;
wherein a cache hit rate is obtained by dividing the number of cache hits by the number of accesses in an arbitrary period;

wherein a tag hit rate per set is obtained by dividing the number of tag hits per set by the number of accesses to the cache memory in the arbitrary period; and wherein one of the data memory and the tag memory at an operating state is transitioned to be at a resting state by the set control circuit in accordance with a result of a comparison with a reference value of a first period.

9. The arithmetic processing device according to claim 8, wherein the reference value of the first period is changed in operation of the arithmetic processing device.

10. The arithmetic processing device according to claim 8, wherein the reference value of the first period is changed per a program carried out by the arithmetic processing device.

11. The arithmetic processing device according to claim 8, wherein the one of the data memory and the tag memory at the resting state is transitioned to be at an operating state by the set control circuit per a reference value of a second period.

12. The arithmetic processing device according to claim 11, wherein the reference value of the second period is changed in operation of the arithmetic processing device.

13. The arithmetic processing device according to claim 11, wherein the reference value of the second period is changed per a program carried out by the arithmetic processing device.

14. The arithmetic processing device according to claim 1, wherein the transition of the state of the one of the data memory and the tag memory to be the operating state or the resting state is controlled according to instructions of the arithmetic processing device.

15. The arithmetic processing device according to claim 1, wherein the transition of the state of the one of the data memory and the tag memory to be the operating state or the resting state is operated by a control circuit and controlled in accordance with instructions of the arithmetic processing device.

16. An arithmetic processing device comprising:
a cache memory comprising a plurality of sets each including a data memory and a tag memory;
a set control circuit;
a counting circuit; and
a register,
wherein the counting circuit counts the number of accesses to the cache memory, the number of cache hits of the cache memory and the number of tag hits of the tag memory per set of at least one set among the plurality of sets;
wherein a cache hit rate is obtained by dividing the number of cache hits by the number of accesses in an arbitrary period;
wherein a tag hit rate is obtained by dividing the number of tag hits by the number of accesses in the arbitrary period; and
wherein a state of the at least one set is transitioned to be at an operation state or a resting state by the set control circuit.

17. An arithmetic processing device comprising:
a cache memory comprising a plurality of sets each including a data memory and a tag memory;
a set control circuit;
a counting circuit; and
a register,
wherein the counting circuit counts the number of accesses to the cache memory, the number of cache hits of the cache memory and the number of tag hits of the tag memory per set of at least one set among the plurality of sets;
wherein a cache hit rate is obtained by dividing the number of cache hits by the number of accesses in an arbitrary period;
wherein a tag hit rate is obtained by dividing the number of tag hits by the number of accesses in the arbitrary period; and
wherein the at least one set at an operating state is transitioned to be at a resting state by the set control circuit in accordance with a comparison result between the cache hit rate and a reference value of a first hit rate, and in accordance with the tag hit rate per set.

18. The arithmetic processing device according to claim 17, wherein the reference value of the first hit rate is changed in operation of the arithmetic processing device.

19. The arithmetic processing device according to claim 17, wherein the reference value of the first hit rate is changed per a program carried out by the arithmetic processing device.

20. The arithmetic processing device according to claim 17, wherein the one of the data memory and the tag memory at the resting state is transitioned to be at an operating state by the set control circuit in accordance with a comparison result between a cache hit rate after transiting to the resting state and a reference value of a second hit rate.

21. The arithmetic processing device according to claim 20, wherein the reference value of the second hit rate is changed in operation of the arithmetic processing device.

22. The arithmetic processing device according to claim 20, wherein the reference value of the second hit rate is changed per a program carried out by the arithmetic processing device.

23. An arithmetic processing device comprising:
a cache memory comprising a plurality of sets each including a data memory and a tag memory;
a set control circuit;
a counting circuit; and
a register,
wherein the counting circuit counts the number of accesses to the cache memory, the number of cache hits of the cache memory and the number of tag hits of the tag memory per set of at least one set among the plurality of sets;
wherein a cache hit rate is obtained by dividing the number of cache hits by the number of accesses in an arbitrary period;
wherein a tag hit rate is obtained by dividing the number of tag hits by the number of accesses in the arbitrary period; and
wherein the at least one set at an operating state is transitioned to be at a resting state by the set control circuit in accordance with a result of comparison with a reference value of a first period.

24. An arithmetic processing device comprising:
a cache memory comprising a plurality of sets each including a data memory and a tag memory;
a set control circuit;

a counting circuit; and a register, wherein the counting circuit counts the number of accesses to the cache memory, the number of cache hits of the cache memory and the number of tag hits of the tag memory per set of at least one set among the plurality of sets;

wherein a cache hit rate is obtained by dividing the number of cache hits by the number of accesses in an arbitrary period;

wherein a set at an operating state which has the smallest number of tag hits among the plurality of sets is transitioned to be at a resting state by the set control circuit in accordance with a result of a comparison with a reference value of a first period.

25. The arithmetic processing device according to claim 23 or 24, wherein the reference value of the first period is changed in operation of the arithmetic processing device.

26. The arithmetic processing device according to claim 23 or 24, wherein the reference value of the first period is changed per a program carried out by the arithmetic processing device.

27. The arithmetic processing device according to claim 23 or 24, wherein the set at the resting state is transitioned to be at an operating state by the set control circuit per a reference value of a second period.

28. The arithmetic processing device according to claim 27, wherein the reference value of the second period is changed in operation of the arithmetic processing device.

29. The arithmetic processing device according to claim 27, wherein the reference value of the second period is changed per a program carried out by the arithmetic processing device.

30. The arithmetic processing device according to claim 16, wherein the transition of the state of the set to be the operating state or the resting state is controlled in accordance with instructions of the arithmetic processing device.

31. The arithmetic processing device according to claim 16, wherein the transition of the state of the set to be the operating state or the resting state is operated by a control circuit and controlled in accordance with instructions of the arithmetic processing device.

32. The arithmetic processing device according to any one of claims 1, 2, 8, 16, 17, 23 and 24, wherein the resting state is a state where pre-charging operation is not carried out when reading out data stored in the data memory and the tag memory.

33. The arithmetic processing device according to any one of claims 1, 2, 8, 16, 17, 23 and 24, wherein the resting state is a state where no power source voltage is supplied to the data memory and the tag memory.

34. The arithmetic processing device according to any one of claims 1, 2, 8, 16, 17, 23 and 24, wherein the arithmetic processing device comprises a thin film transistor using a semiconductor thin film formed over a substrate having an insulating surface.

35. An electronic appliance using the arithmetic processing device according to any one of claims 1, 2, 8, 16, 17, 23 and 24, wherein the arithmetic processing device is applied to at least one selected from the group consisting of a display device, a camera, a personal computer, a portable information terminal, an audio reproducing device, and a mobile phone.

36. The arithmetic processing device according to claim 2 or 8, wherein the transition of the one of the data memory and the tag memory to be at the resting state is controlled in accordance with instructions of the arithmetic processing device.

37. The arithmetic processing device according to claim 2 or 8, wherein the transition of the one of the data memory and the tag memory to be at the resting state is operated by a control circuit and controlled in accordance with instructions of the arithmetic processing device.

38. The arithmetic processing device according to any one of claims 17, 23 and 24, wherein the transition of the state of the set to be the resting state is controlled in accordance with instructions of the arithmetic processing device.

39. The arithmetic processing device according to claim 1, wherein the transition of the state of the set to be the resting state is operated by a control circuit and controlled in accordance with instructions of the arithmetic processing device.

40. The arithmetic processing device according to claim 34, wherein the substrate having an insulating surface is any one of a glass substrate, a quartz substrate, a plastic substrate, and an SOI substrate.

* * * * *